United States Patent Office 3,671,256
Patented June 20, 1972

3,671,256
POLYMERIC HARDENERS CONTAINING AZIRIDINYL UNITS ON THE SIDE CHAIN
Louis Morton Minsk and Hyman L. Cohen, Rochester, N.Y., and Elliott Frauenglass, Newington, Conn., assignors to Eastman Kodak Company, Rochester, N.Y.
No Drawing. Filed Apr. 16, 1970, Ser. No. 29,249
Int. Cl. G03c 1/30
U.S. Cl. 96—111      8 Claims

ABSTRACT OF THE DISCLOSURE

New high molecular weight linear addition polymers are provided comprising a main chain of a linear saturated substituent and a side chain of aziridinyl units separated from said main chain by a carbamyl, carbonyl or an alkylene ester group. When incorporated into photographic elements and emulsions said polymers are substantially safe and effective hardeners for hydrophilic colloids used therein as vehicles or binders and do not exhibit unwanted sensitometric effects.

BACKGROUND OF THE INVENTION

Field of the invention

This invention relates to new soluble high molecular weight polymers, their preparation and use. In one aspect, these new polymers are used to harden proteins and non-proteinaceous substances. In another aspect, this invention relates to using said polymers in photography and in photographic elements.

Description of the prior art

In the use of various proteins and non-proteinaceous substances, it is frequently necessary to harden them thereby rendering them more resistant to water and to widely varying temperatures and pH values. Typical of such hardenable substances are poly(vinyl alcohol), copoly(alkyl acrylate, acrylic acid), poly(butyl carboxy ester lactone), alone or in combination with other substances including gelatin, gelatin derivatives and other substances comprising varying amounts of gelatin in colloidal suspensions, emulsions, and dispersions.

In the use of gelatin, for example, particularly for photographic use, it is also frequently necessary to use a succession of aqueous baths which either vary in pH or which are at elevated temperatures. Much work has previously been done in treating gelatin to improve its resistance to water so that swelling and melting of the gelatin does not occur upon treatment thereof with said aqueous baths in processing operations or in hot drying.

Many proteinaceous compounds such as gelatin, casein, zein, collagen, and the like have been hardened by treatment with hardeners falling into three or four categories as follows:

(1) Metallic salts such as those of chromium, aluminum, and zirconium;
(2) aldehydes such as formaldehyde;
(3) 1,2-; 1,4-diketones;
(4) quinones which might possibly be considered as diketones.

These hardening compounds have, however, exhibited unwanted effects of one kind or another in many instances when placed in photographic elements. Consequently, hardeners presumably having little or substantially no known detrimental photographic effects and providing the desired protection have been long sought and were apparently provided for by the aziridine-containing hardening compounds of U.S. Pat. 1,950,197, August 1960, Allen and Webster and U.S. Pat. 2,964,404, December 1960, Burness. However, the aziridines, notwithstanding their good hardening properties, have been known to cause severe detrimental physiological effects in the workers handling said substances. Further, in layer systems, these compounds do not restrict their activities to the layers in which they are placed but wander through and diffuse to the various other layers making difficult the formulation of an adequate concentration of hardener required to harden any particular layer, (or layers).

Previous attempts to prepare polymers containing aziridinyl groups in the side chain have resulted in compounds which are completely insoluble, thus rendering these compounds unsatisfactory for purposes disclosed hereafter. Iwakura et al., Makromol Chemie 78, 168–171 (1964). Although the mechanism of the reaction is not known, it is believed that the maintenance of anhydrous conditions during the course of the polymerization may be a contributing factor in the formation of a soluble polymer.

It is one object of this invention to provide new, soluble high molecular weight polymers.

A further object of this invention is to provide soluble aziridine-containing polymers.

Still another object of this invention is to provide soluble, macromolecular hardening compounds capable of hardening materials such as non-proteinaceous substances, proteins and other natural and synthetic substances containing hardening sites which comprise primary or secondary amino groups, and/or hydroxyl groups, and/or carboxyl groups.

Yet, a further object of this invention is to provide non-wandering hardeners which do not adversely affect the photographic sensitometric properties of the substances they harden or otherwise effect detrimental physiologic changes in persons handling said hardeners.

Other objects will become apparent from the following.

SUMMARY OF THE INVENTION

We have now found a new class of polymers and means to harden various hardenable materials such as proteins and more particularly substances such as gelatin and synthetic polymers in their many forms such as hydrophilic colloids, emulsion layers, and the like. Hardening uses include photographic emulsion vehicles and layers, such as antistatic, antihalation and backing layers and those generally wherever solvent resistant layers are used. These hardenable materials usually contain hardening sites such as primary and/or secondary amino groups and/or carboxylic acid groups and/or hydroxyl groups. These new polymers are high molecular weight linear polymers which have either a low or substantially no vapor pressure and are conveniently solvent soluble in various solvents such as water, acetone, and the like. By use of the term solvent soluble is meant a compatability of the polymer with the aqueous environment of the protein, such as a gelatin dispersion, whereby the latter does not reject or otherwise expel the polymer. This is of particular importance, for example, in photographic use. There, the binder or vehicle, being a soluble base and often in layer form, is often required to be totally or partially insolubilized in order to withstand the effects of aqueous baths, elevated temperatures, and varying pH. These new polymers have been found to exert their hardening action selectively in the layers in which they are placed and, consequently, neither wander nor invade adjacent layers. These polymers are surprisingly effective in a wide range of concentrations and are particularly effective in ranges of from about 0.5% to 10% and preferably between about 1% to 6% by weight of the vehicle to be hardened.

One significant feature of this invention is that, when used for photographic purposes, the non-migrating polymeric compounds described herein, do not adversely affect the sensitometric characteristics of the photographic layers. Neither does their use cause any undesirable physiological reactions to those workers handling them. Another significant feature of this invention is that these polymeric compounds are soluble and are economically desirable since they can be used in low concentrations in aqueous systems such as those in which gelatin is normally used.

DESCRIPTION OF PREFERRED EMBODIMENTS

One embodiment of our invention relates to a soluble high molecular weight, linear addition polymer comprising a main chain of carbon atoms and a side chain of aziridine groups.

Another embodiment of this invention relates to compositions comprising proteins such as hydrophilic colloids, polymers comprising hardenable sites, such as primary or secondary amino groups, hydroxy groups, carboxyl groups, etc., gelatin, gelatin emulsions or layers and a linear polymer as described above, present in hardening concentration.

Another embodiment of our invention relates to a polymer having a linear saturated carbon atom main chain

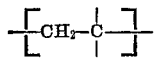

having attached thereto a multiplicity of solubilizing groups and side chains comprising aziridinyl groups joined to the main chain by a carbonyl group, a carbamyl group, or an alkylene ester group.

In another embodiment, this invention relates to linear polymers comprising about from 10 to about 100 weight percent of at least one repeating unit having the formula:

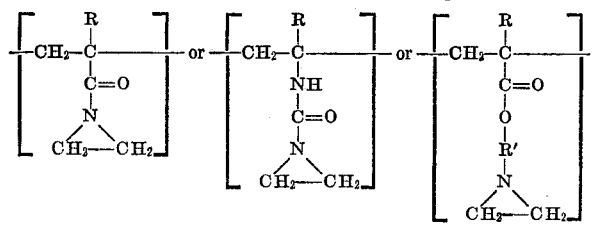

where R is hydrogen or lower alkyl groups, for example, from 1 to 4 carbon atoms, R' is an alkylene group, for example, of from 1 to 6 carbon atoms, and to photographic elements comprising a support and a hardenable vehicle hardened by said polymers having said formulae.

As already indicated, these new polymers have a high molecular weight, that is, from about 1,000 to about 100,000 and preferably not less than about 3,000.

These polymeric compounds are comprised of recurring linear units as described above, which units preferably contain water-solubilizing side chain groups such as substituted carbamoyl, pyrrolidonyl, morpholino, and the like. The recurring linear units can be substituted on the carbon atoms to which are attached the side chain activating groups.

These compounds can be combined in a photographic emulsion in a variety of ways and because they are soluble, they are useful in a wide range of concentrations.

Representative examples of compounds embraced by our invention include:

copoly(dimethylacrylamide-vinylcarbamyl aziridine),
poly(vinylcarbamyl aziridine),
poly(acrylyl-aziridine),
copoly(acrylyl aziridine-N-vinyl pyrrolidone),
copoly(acrylyl aziridine-acrylamide),
copoly(ethylacrylate-methylacrylyl aziridine),
copoly(acrylylaziridine-dimethylacrylamide),
copoly(N-acrylylaziridine-N'-acrylylmorpholine),
copoly[2-(1-aziridinyl)ethylacrylate-dimethyl-
 acrylamide].

All reactions for preparing the compounds of our invention are conducted in the presence of the desired solvents, such as for example, where organic solvents are used, acetone, tetrahydrofurane, dimethylformamide, and the like, at moderate temperatures and the reaction are not pressure dependent. Consequently, superatmospheric or subatmospheric pressures can be employed. As is obvious to one skilled in the art, the specific reaction conditions, for example, temperature, pressure, and the like depend upon the particular reactants used.

The compounds described in this application can be used effectively in combination with hardenable materials in general but they are most advantageously used with natural substances or synthetic polymers used as vehicles or binders in preparing photographic elements or adjuvants for light-sensitive elements. Specific materials which can be hardened according to the practice of this invention include hardenable materials such as polymers, for example, gelatin, colloidal albumin, carboxyl and/or hydroxyl-containing water-soluble vinyl polymers, cellulose derivatives, proteins, those polymers containing dispersed polymerized vinyl compounds particularly those which increase the dimensional stability of photographic materials as exemplified by polymers of alkyl acrylates, methacrylates, acrylic acid, sulfoalkyl acrylates or methacrylates, maleic acid, and the like.

In addition to the hardening agents described herein, emulsions including the silver halide emulsion of a photographic element useful in this invention can contain conventional addenda such as gelatin plasticizers, coating aids, antifoggants such as the azaindines and other hardeners such as aldehyde hardeners, e.g., formaldehyde, mucochloric acid, glutaraldehyde bis(sodium bisulfite), maleic dialdehyde, aziridines, dioxane derivatives and oxypolysaccharides. Sensitizing dyes useful in sensitizing such emulsions are described, for example, in U.S. Pats. 2,526,632 of Brooker and White issued Oct. 24, 1950 and 2,503,776 of Sprague issued Apr. 11, 1950. Spectral sensitizers which can be used are the cyanines, merocyanines, complex (trinuclear) cyanines, complex (trinuclear) merocyanines, styryls, and hemicyanines. Developing agents can also be incorporated into the silver halide emulsion if desired or can be contained in a separate underlayer. Various silver salts can be used as the sensitive salt such as silver bromide, silver iodide, silver chloride, or mixed silver halides such as silver chlorobromide or silver bromoiodide. The silver halides used can be those which form latent images predominantly on the surface of the silver halide grains or those which form latent images inside the silver halide crystals such as described in U.S. Pat. No. 2,592,250 of Davey and Knott issued Apr. 8, 1952.

The hardening agents described herein can be used in various kinds of photographic emulsions. In addition to being useful in orthochromatic, panchromatic and infrared emulsions, they are also useful in X-ray and other nonoptically sensitized emulsions. They can be added to the emulsions before or after the addition of any optically sensitizing dyes which can be used. They are effective in sulfur and gold sensitized silver halide emulsions.

The emulsion layers of a photographic element hardened by polymers of the instant invention can contain any of the hydrophilic, water-permeable binding materials suitable for this purpose. Suitable materials include gelatin, colloidal albumin, polyvinyl compounds, cellulose derivatives, acrylamide polymers, etc. Mixtures of these binding agents can also be used. The binding agents for the emulsion layer of the photographic element can also contain dispersed polymerized vinyl compounds. Such compounds are disclosed, for example, in U.S. Pats. 3,142,568 of Nottorf issued July 28, 1964; 3,193,386 of White issued July 6, 1965; 3,062,674 of Houck, Smith and Yudelson issued Nov. 6, 1962; and 3,220,844 of Houch, Smith and Yudelson issued Nov. 30, 1965;

and include the water-insoluble polymers of alkyl acrylates and methacrylates, acrylic acid, sulfoalkyl acrylates or methacrylates, and the like.

The emulsion layers of a photographic element hardened by the polymers of the instant invention can be coated on a wide variety of supports. Typical supports are cellulose nitrate film, cellulose ester film, polyvinyl acetal film, polystyrene film, poly(ethylene terephthalate) film, and related films or resinous materials as well as glass, paper, metal and the like. Supports such as paper which are coated with α-olefin polymers, particularly polymers of α-olefins containing two or more carbon atoms, as exemplified by polyethylene, polypropylene, ethylene-butene copolymers, and the like can also be employed.

The speed of the photographic emulsions hardened by polymers of the instant invention can be further increased by including in the emulsions a variety of hydrophilic colloids such as carboxymethyl protein of the type described in U.S. Pat. No. 3,011,890 of Gates, Jr., Miller and Koller issued Dec. 5, 1961, and polysaccharides of the type described in Canadian Pat. 635,206 of Koller and Russell issued Jan. 23, 1962.

Photographic emulsions hardened by polymers of the instant invention can also contain speed-increasing compounds such as quaternary ammonium compounds, polyethylene glycols or thioethers. Frequently, useful effects can be obtained by adding the aforementioned speed-increasing compounds to the photographic developer solutions instead of, or in addition to, the photographic emulsions.

The polymeric hardeners described herein can be used in emulsions intended for color photography, for example, emulsions containing color-forming couplers or emulsions to be developed by solutions containing couplers or other color-generating materials, emulsions of the mixed-packet type such as described in U.S. Pat. 2,698,794 of Godowsky issued Jan. 4, 1955; in silver dye-bleach systems; and emulsions of the mixed-grain type such as described in U.S. Pat. 2,592,243 of Carroll and Hanson issued Apr. 8, 1952.

Silver halide emulsions hardened by the polymers of this invention can be sensitized using any of the well-known techniques in emulsion making, for example, by digesting with naturally active gelatin or various sulfur, selenium, tellurium compounds and/or gold compounds. The emulsions can also be sensitized with salts of noble metals of Group VIII of the Periodic Table which have an atomic weight greater than 100.

Silver halide emulsions containing the hardeners of the invention can be used in diffusion transfer processes which utilize the undeveloped silver halide in non-image areas of the negative to form a positive by dissolving the undeveloped silver halide and precipitating it on a silver layer in close proximity to the original silver halide emulsion layer. Such processes are described in U.S. Pats. 2,352,014 of Rott issued June 20, 1944; 2,543,181 of Land issued Feb. 27, 1951; and 3,020,155 of Yackel, Yutzy, Foster and Rasch issued Feb. 6, 1962. The emulsions can also be used in diffusion transfer color processes which utilize a diffusion transfer of an imagewise distribution of developer, coupler or dye, from a light-sensitive layer to a second layer, while the two layers are in close proximity to one another.

As can be seen from the above and the examples hereafter, it is particularly effective in the practice of this invention to incorporate the hardeners directly into a photographic element. This can be achieved most effectively by inclusion into the emulsion layers or other layers so that the non-wandering properties are fully utilized.

The hardening agents of this invention can be incorporated to advantage during manufacture in silver halide emulsions representing the variations described above.

The following examples are intended to illustrate our invention and it is understood that modifications and variations coming within the spirit of the invention are intended to be included within the scope of the claims.

EXAMPLE 1

(A) Preparation of acrylylaziridine monomer

Ethylenimine (43 parts), 103 parts of triethylamine, 160 parts of sodium carbonate and 400 parts of dry acetone are stirred in a methanol-Dry-Ice bath under nitrogen, while slowly adding 90.5 parts of acrylyl chloride. Filtration, evaporation in the presence of sodium carbonate at 0° C. and distillation at .15 mm. Hg pressure gives 36.5 parts of colorless liquid, $n^{23}{}_D$ 1.4722. The foreruns are discarded. Because the distillate is found to be explosively unstable, it is kept at Dry-Ice temperatures and, alternatively, is diluted with acetone and stored in a freezer.

(B) Preparation of poly(acrylylaziridine)

Acrylylaziridine (5 parts) and .15 part of azobis(isobutyronitrile) in 20 parts of dry acetone are refluxed under nitrogen for 90 minutes. The solution is precipitated into petroleum ether (B.P. 30°–60° C.). The precipitate is filtered and dissolved in dry acetone.

EXAMPLE 2

Preparation of poly(vinylcarbamyl aziridine)

A mixture of 5 parts of poly(phenyl vinylcarbamate) and 50 parts of aziridine are tumbled for three hours resulting in complete solution of the polymer. After standing at room temperature for 2 days, a sample of this is added to water producing no visible precipitate. Addition to both ether and acetone, however, yields a precipitate. The mixture is precipitated in ether and washed twice, rapidly, with acetone. Most of this sample is dissolved in 200 parts of water without drying. The residue is extensively washed with acetone and vacuum dried for analysis which shows the following: Found (percent): C, 50.0, 50.4; H, 7.4; N, 21.2, 20.8. Theoretical (percent): C, 53.1; H, 7.1; N, 25.0.

The aqueous solution is dialyzed in a cellophane bag against distilled water and then concentrated to 40 parts. The concentrate contains 8 percent solids. One part of this solution is added to a solution of 1 part of gelatin in 10 parts of warm water. The mixture is poured onto a glass plate and allowed to stand at room temperature for about 15–16 hours and is then insoluble in boiling water.

EXAMPLE 3

Preparation of copoly(ethylacrylate-methacrylyl-aziridine)

Twenty parts of ethyl acrylate are added to 9 parts of methacrylylaziridine, 0.2 part of azobis(isobutyronitrile) and 150 parts of dried tetrahydrofurane and the mixture heated at 60° C. overnight (15 hours). The resulting polymer is precipitated in petroleum ether, washed and vacuum dried and is found to be actone soluble.

EXAMPLE 4

(A) Preparation of copoly(acrylylaziridine-N,N-dimethylacrylamide)

Six parts of acrylylaziridine, 12 parts of N,N-dimethylacrylamide, 0.54 part of azobis(isobutyronitrile) and 72 parts of dry acetone are heated at 60° C. for 55 minutes. This resulting polymer is precipitated in petroleum ether, then immediately redissolved in dry acetone as a precaution against crosslinking. The nuclear magnetic resonance tests indicate that the mole ratio is 1.7 parts of dimethylacrylamide to 1 part of acrylylaziridine.

(B) Hardening with copoly(acrylylaziridine-N,N-dimethylacrylamide) and lactone vehicle The above polymer in acetone solution is added to a solution at pH 6.5 of the sodium salt of a butyl carboxy ester lactone of the vinyl acetate-maleic anhydride interpolymer as described in Example 1 of U.S. Pat. 3,260,706 infra having a citation titer of 5 ml. of normal base per gram and cooled upon a glass plate support. The quantity of polymer used amounts to 10% of the weight of the lactone. A strongly hardened film results which resists solution in boiling water and is superior in hardness when compared to untreated vehicle.

(C) Hardening with copoly(acrylylaziridine-N,N-dimethylacrylamide) and poly(vinyl alcohol)

Ten percent by weight of the aziridine polymer is added in aqueous solution to polyvinyl alcohol and to this is added a catalytic amount of sulfuric acid. The resulting solution is placed upon a glass plate and the resulting film is substantially harder than untreated polyvinyl alcohol, the latter either with or without the addition of sulfuric acid in the same amount.

(D) Hardening with copoly(acrylylaziridine-N,N-dimethylacrylamide) and gelatin

Ten percent by weight of this polymer, based on the dry weight of gelatin employed, is added in aqueous solution to 10% gelatin solution and then coated onto a glass plate. The resulting film is substantially harder than untreated gelatin and resists solution in boiling water.

EXAMPLE 5

The compounds prepared in Examples 3 and 4 are added to separate portions of a high-speed silver bromoiodide emulsion which are panchromatically sensitized with a cyanine dye. Each emulsion sample is coated on a cellulose acetate film support at a coverage of 432 mg. of silver and 980 mg. of gelatin per square foot. A sample of each film coating is exposed on an Eastman 1B sensitometer, processed for five minutes in Kodak DK-50 developer, fixed, washed and dried. Control samples of emulsion without hardener are prepared and processed by the same procedure with the following test results:

|  | Concentration percent by weight of gelatin | Relative speed | γ | Fog | Percent swell in water |
|---|---|---|---|---|---|
| copoly(ethylacrylate-methacrylylaziridine) | Control | 100 | 1.27 | .12 | 780 |
|  | 1 | 100 | 1.30 | .10 | 760 |
|  | 3 | 97 | 1.47 | .11 | 720 |
|  | 10 | 107 | 1.32 | .10 | 480 |
| copoly(acrylylaziridine-dimethyl acrylamide) | Control | 100 | 1.28 | .22 | 660 |
|  | 3 | 95 | 1.13 | .19 | 450 |
|  | 6 | 95 | .98 | .22 | 370 |
|  | 10 | 82 | .95 | .23 | 320 |

These results show that the emulsion layers containing hardeners prepared according to Examples 3 and 4 exhibit greatly reduced swelling as compared to control samples not containing said hardeners. Further, these results indicate the above hardeners are compatible with the photographic characteristics of the emulsion.

EXAMPLE 6

Alternative preparation of copoly(acrylaziridine-N,N-dimethylacrylamide)

This polymer can also be made by direct reaction of a suitable polymeric ester with ethylenimine. For example, 5 parts of copoly(N,N-dimethylacrylamide-phenyl acrylate), comprising 23 mole percent phenyl acrylate and 100 parts of ethylenimine are stirred until a solution forms. This solution after standing overnight is heated under nitrogen at 40° C. for 2 hours. The polymer is precipitated in petroleum ether and redissolved in a 50:50 acetone N,N-dimethylformamide.

EXAMPLE 7

(A) Preparation of copoly(acrylylaziridine-N-vinylpyrrolidone)

Acrylylaziridine 4.85 parts, 11.1 parts of N-vinyl pyrrolidone and 0.48 part of azobis(isobutyronitrile) are refluxed in 64 parts of dry acetone under nitrogen for 50 minutes. The solution is precipitated by pouring into petroleum ether having a boiling point of about between 30°–60° C., then filtered and the resulting precipitate is dissolved in absolute alcohol.

(B) Hardening with copoly(acrylylaziridine-N-vinylpyrrolidone)

Ten percent of copoly(acrylylaziridine-N-vinylpyrrolidone), based on the dry weight of gelatin employed, is added to a 10% solution of gelatin just prior to coating on a glass plate support, then dried. A clear film is obtained which is not soluble in boiling water.

EXAMPLE 8

(A) Preparation of copoly(N-acrylylaziridine-N'-isopropylacrylamide)

4.5 parts acrylylaziridine, 5.7 parts of N-isopropylacrylamide and 0.0038 part of azobis(isobutyronitrile) are refluxed under nitrogen in 42 parts of dry acetone for 2 hours; this solution is then poured into petroleum ether and the resulting precipitate is dissolved in dry acetone. The nuclear magnetic resonance spectrum indicates approximately 60% acrylylaziridine content.

(B) Hardening with copoly(N-acrylylaziridine-N'-isopropylacrylamide) and polymeric vehicles (1) Ethyl acrylate-acrylic acid partial sodium salt copolymer 80%:20% in water at pH 6.8 is coated on a glass plate support along with 10% by weight of the copolymer(N-acrylylaziridine - N' - isopropylacrylamide). After drying, the resulting film is insoluble in boiling water.

(2) In place of the above acrylic acid polymer, there is substituted the butyl ester lactone of vinyl acetate—maleic anhydride copolymer described in Example 1 of U.S. Pat. 3,260,706 of Minsk and Abel issued July 12, 1966. After drying, the resulting film is insoluble in acetone.

EXAMPLE 9

Preparation of copoly(N-acrylylaziridine-N'-acrylylmorpholine)

3.9 parts of acrylylaziridine, 5 parts of acrylylmorpholine and 0.27 part of azobis(isobutyronitrile) are refluxed under nitrogen in 28 parts of dry acetone for 90 minutes. This solution is precipitated by pouring into petroleum ether and the precipitate dissolved in dry acetone.

Similar good results indicating a resistance to boiling water are obtained with this example when it is tested according to the procedures described in the preceding examples.

EXAMPLE 10

The swell characteristics of the compounds prepared in Examples 1, 7 and 9 are further tested by the procedure of Example 5 with the following results:

|  | Concentration percent by weight of gelatin | Percent swell in water |
|---|---|---|
| Poly(acrylylaziridine) | Control | 730 |
|  | 1 | 600 |
|  | 5 | 420 |
| Copoly(acrylylaziridine-N-vinylpyrrolidone) | Control | 730 |
|  | 1 | 600 |
|  | 5 | 380 |
|  | 10 | 310 |
| Copoly(N-acrylylaziridine-N'-acrylylmorpholine) | Control | 680 |
|  | 3 | 620 |
|  | 6 | 530 |
|  | 12.5 | 440 |

EXAMPLE 11

Preparation of copoly[2-(1-aziridinyl)ethyl acrylate-dimethylacrylamide]

In the preparation of this polymer, the monomer 2-(1-aziridinyl)ethyl acrylate is first prepared as follows:

With stirring, a solution of 87 g. (1 mole) of 2-(1-aziridinyl)ethanol in 200 ml. of ether is added over a period of 20 minutes to 50.5 g. (1.2 moles) of sodium hydride (5 percent in mineral oil) in 500 ml. of ether contained in a 2 liter flask fitted with a reflux condenser. Stirring is continued for 1 hour after completion of the addition. The resulting slurry is added gradually with stirring to a mixture of 126 g. (1 mole) of acrylic anhydride in 1.5 liters of ether contained in a 4 liter flask fitted with a reflux condenser. The resulting mixture is filtered, and the solvent removed by evaporation to give a colorless liquid which is vacuum distilled. Three fractions are obtained:

| Fraction: | Pressure (mm.) | B.P. (° C.) | Weight (grams) | ND |
|---|---|---|---|---|
| 1 | 6.8-6.5 | 59-62 | 14.8 | 1.4446 |
| 2 | 6.4-6.0 | 62.5-63 | 6.5 | 1.4462 |
| 3 | 1.4 | 44 | 11.5 | 1.4511 |

*Analysis for Fraction 3.*—Calcd. for $C_7H_{11}NO_2$ (percent): C, 59.6; H, 7.9; N, 9.9. Found (percent): C, 59.5; H, 8.1; N, 10.1.

A mixture of 360 mg. (3 percent solution) azobisisobutyronitrile, 5 g. of 2-(1-aziridinyl)ethyl acrylate, 6.8 g. of dimethylacrylamide and 50 g. of acetone are refluxed for 4 hours under a nitrogen atmosphere and poured into 1 liter of petroleum ether. The precipitated polymer is filtered, washed with fresh petroleum ether and dissolved in 100 ml. of dry acetone. The solution is filtered, yielding an acetone dope weighing 50 g. and containing 17 percent solids.

The ability of this polymer to harden gelatin and carboxyl containing polymers is illustrated by the following examples:

(1) A mixture of 10 cc. of a 10 percent aqueous gelatin solution, 10 cc. of water and 0.4 cc. of the above dope is prepared. A coating is made immediately on a glass plate and dried overnight. The clear film obtained did not dissolve in boiling water.

(2) A mixture of 10 cc. of an 11 percent aqueous solution of a butyl carboxy ester lactone polymer (as described in U.S. 3,260,706 and having a titer of 5 ml. of N base per gram), 10 cc. of water and 0.4 cc. of the above dope is prepared. This is coated immediately on a glass plate and dried overnight. The clear film obtained swelled but did not dissolve in cold water.

While the above examples disclose specific methods of preparing the monomers of this invention and their polymers a general method of preparation of said monomers is as follows:

One mole of an ethylenically unsaturated, and preferably an acrylic monomer containing an acid chloride, acid anhydride or ester group is slowly added to a mixture of about 10 to about 50 percent molar excess of ethyleneimine, or an N-hydroxyalkyl substituted ethyleneimine, an anhydrous organic solvent, and an esterification catalyst such as base catalysts, for example, sodium carbonate, sodium hydroxide and the like. This is conducted under carefully controlled substantially anhydrous conditions and at less than ambient temperatures and preferably with the aid of Dry Ice. Upon completion of the resulting reaction the mixture is filtered and the product isolated from the filtrate by any suitable means, such as by distillation.

The invention has been described in considerable detail with reference to certain preferred embodiments thereof, but it will be understood that variations and modifications can be effected within the spirit and scope of the invention.

We claim:

1. A composition comprising a photographic silver halide gelatin emulsion and, in hardening concentration, a linear addition polymer having a molecular weight of about 1,000 to about 100,000 and comprising from about 10 to about 100 weight percent of at least one repeating unit having the formula:

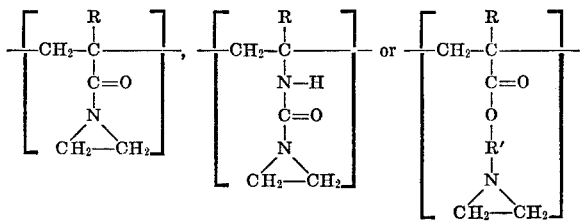

where R is hydrogen or lower alkyl and R' is alkylene, the remaining weight percent, if any, of said polymer being repeating units containing water-solubilizing groups.

2. The composition of claim 1 in which the high molecular weight linear addition polymer is copoly(dimethyl acrylamide-vinylcarbamyl aziridine),
poly(vinylcarbamylaziridine),
poly(acrylyl-aziridine),
copoly(acrylyl aziridine-N-vinyl pyrrolidone),
copoly(acrylyl aziridine-acrylamide),
copoly(ethylacrylate methylacrylyl aziridine),
copoly(acrylyl aziridine-dimethylacrylamide),
copoly(N-acrylylaziridine-N'-acrylylmorpholine),
copoly[2-(1-aziridinyl)ethylacrylate-dimethylacrylamide],
copoly(acrylylaziridine-N,N-dimethylacrylamide) or
copoly(acrylylaziridine-N-vinyl pyrrolidone).

3. The composition of claim 1 in which the hardening concentration of said high molecular weight linear addition polymer is from about 0.5 to about 10 percent by weight of photographic gelatin.

4. The combination of claim 1 further comprising in said photographic gelatin emulsion a polymer of acrylic acid or vinyl alcohol.

5. The composition of claim 1 in which the high molecular weight linear addition polymer is acetone soluble.

6. A photographic silver halide containing element comprising a support, a hydrophilic colloid layer and, in hardening concentration, a linear addition polymer having a molecular weight of about 1,000 to about 100,000 and comprising from about 10 to about 100 weight percent of at least one repeating unit having the formula:

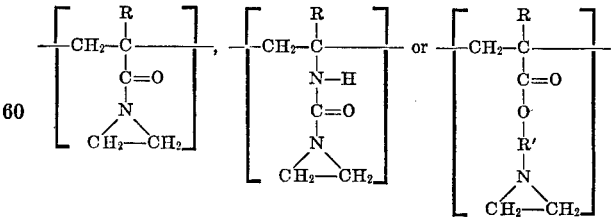

where R is hydrogen or alkyl and R' is alkylene, the remaining weight percent, if any, of said polymer being repeating units containing water-solubilizing groups.

7. The photographic element of claim 6 in which said layer is a gelatin photographic silver halide emulsion layer.

8. The photographic element of claim 7 which comprises a polymer of acrylic acid or vinyl alcohol in said emulsion layer.

(References on following page)

References Cited

UNITED STATES PATENTS

| | | | |
|---|---|---|---|
| 3,257,208 | 6/1966 | Paesschen | 96—114 |
| 3,551,159 | 12/1970 | Froehlich | 96—111 |
| 3,392,023 | 7/1968 | Burness | 96—111 |
| 3,549,378 | 12/1970 | Burness et al. | 96—111 |
| 3,296,155 | 1/1967 | Minsk et al. | 96—111 |
| 3,277,030 | 10/1966 | Minsk et al. | 96—111 |
| 2,950,197 | 8/1960 | Allen et al. | 96—111 |
| 2,983,611 | 5/1961 | Allen et al. | 96—111 |

NORMAN G. TORCHIN, Primary Examiner

W. H. LOUIE, JR., Assistant Examiner

U.S. Cl. X.R.

260—8, 2 EN, 80, 117; 106—125